United States Patent Office 3,449,029
Patented June 10, 1969

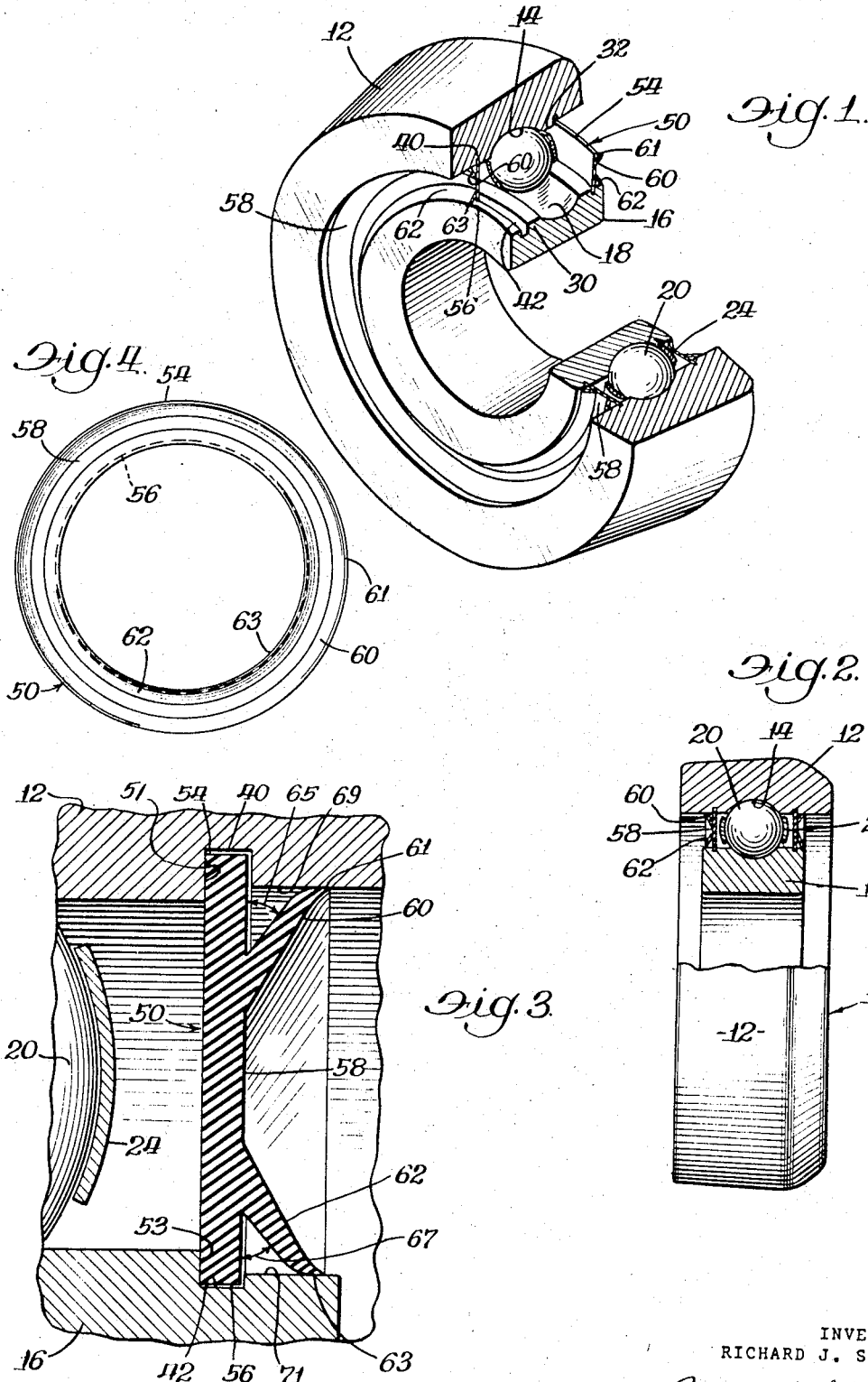

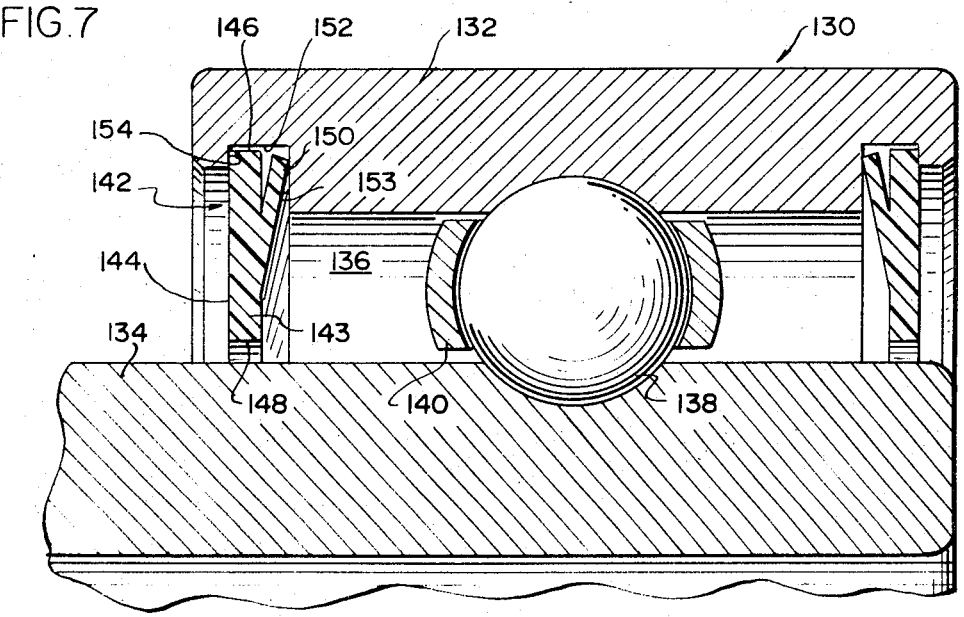
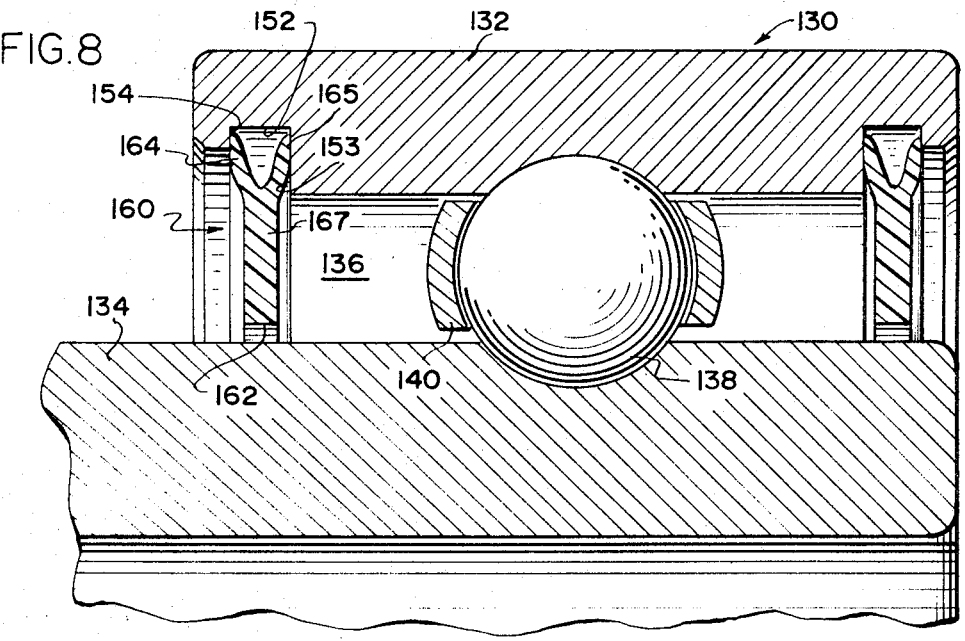

3,449,029
BEARING ASSEMBLY AND SEAL
Richard J. Smith, Valparaiso, Ind., assignor to McGill Manufacturing Company, Inc., Valparaiso, Ind., a corporation of Indiana
Continuation-in-part of application Ser. No. 488,194, Sept. 17, 1965. This application Jan. 17, 1968, Ser. No. 698,637
Int. Cl. F16c 1/24, 33/78
U.S. Cl. 308—187.2                           3 Claims

ABSTRACT OF THE DISCLOSURE

A bearing assembly has an outer race ring which is rotatable with respect to the inner race ring. A radially extending groove is located in the outboard axial end of the outer race ring. An annular sealing ring of synthetic material has a radial face defined by an outer peripheral edge and an inner annular edge. An integral extension extends upwardly divergent to the radial face. The ring is supported in the outer race ring by inserting the outer peripheral edge into the groove with the outer extension forming an interference fit with the wall of the groove. The extension applies pressure to the sealing ring to maintain it in a running contact fit with the opposite wall of the groove.

Cross-reference to related application

This application is a continuation-in-part of application Ser. No. 488,194, filed Sept. 17, 1965, now Patent No. 3,366,428, and assigned to the assignee of this application.

Background of the invention

This invention relates generally to molded seal rings for bearing assemblies, and more particularly to such a seal providing a multiple contact with moving parts in an anti-friction bearing assembly, adapted to keep moisture and foreign matter out of the bearing raceway.

In many industrial applications where there is a possibility of only slight contamination getting into the anti-friction bearing elements, a seal having a single element contact with a bearing ring will retain the lubricant within the bearing, and exclude foreign particles such as dirt so that the bearing operates satisfactorily during its normal life. In heavy duty applications, however, where the bearings are constantly being exposed to dirt, moisture, chemicals and the like as in farm implements, single element bearing seals have been found to be unsatisfactory and are usually replaced with a multi-element counterpart.

It has been common in the past to have multi-element seals which were contained in a groove in either the inner or outer race of the bearing with the uncontained ends of the seal elements dragging on the surface of the other race in a running contact seal therewith. The material commonly used for the seal elements made the seals bulky, and required a large amount of space to perform the sealing function, thereby limiting the area of the bearing surface that could be utilized and indirectly limiting the load that could be supported for any given number of hours of bearing life. In addition, tolerances were generally critical between the outer and inner race rings in order to limit seal "drag" on the bearing races to a useful amount. These close tolerances and the need for a better finish to reduce drag necessitates grinding the mating surfaces of the race rings and generally added to production costs.

Many attempts have been made within the bearing industry to use nylon in the sealing elements because of possible space saving and in particular because of the relatively low cost of nylon as compared to other materials currently used for seals. Nylon, however, is pressure sensitive and, if mounted without external support, it will not maintain a tight or pressed fit with an associated steel bearing member. Therefore, after a short period of time in an operating installation, a tightly fitted nylon sealing member which is confined in a groove in one race and permitted to drag on the other race within close tolerances will become loose and allow the entrance of foreign material into the bearing raceway.

Summary of the invention

It is one object of this invention to provide an improved lubricant seal for an anti-friction bearing assembly that extends bearing life.

It is another object of this invention to utilize the advantages in an anti-friction bearing assembly of synthetic material such as nylon which can be molded into a seal requiring a minimum of space, thereby permitting larger area bearing surfaces to be utilized in a given axial space in a bearing assembly.

It is another object of this invention to provide an improved multiple contact lubricant seal for an anti-friction bearing assembly that is relatively simple and inexpensive to produce, and provides a tight seal in a running contact fit with the bearing rings.

The principal feature of the invention is the provision of a multiple contact molded sealing ring in such a structure that when retained in two corresponding grooves in the inner race ring and outer race ring, pressure is developed between portions of the sealing ring and faces of the race ring portions to such a degree that foreign matter is excluded from the bearing by a resilient running contact fit between the sealing ring and race rings, and to such a degree that positive retention of the sealing ring in the race rings during the life of the sealing ring is accomplished.

Another feature of this invention is the provision of an annular sealing unit for a bearing assembly having an inner race ring and an outer race ring with anti-friction elements therein wherein the sealing unit includes a body portion having a sealing portion extending radially outwardly therefrom and a sealing portion extending radially inwardly therefrom. Each of the sealing portions have a pair of extensions therein which are separated axially from one another at their outer radial end and join one another at their inner radial end. At least one extension of each pair is fitted and maintained in grooves in the inner and outer race rings. The other extension in the pair applies pressure on its corresponding race ring and on the extension received in the groove to maintain a running contact seal with the wall thereof.

A further feature of this invention is the provision of an annular sealing ring having an inner annular edge and an outer peripheral edge with outer and inner integral resilient extensions thereon, and extending therefrom in a direction generally toward the outer and inner edge of the sealing ring. The outer and inner edges of the ring are retained in corresponding seal-retaining grooves in the respective race rings, with the extensions being received in and resiliently compressed by the walls of the grooves into a running contact seal therewith. The compressed extension react to resiliently press the sealing ring into a running contact seal with the walls of such grooves in the bearing assembly. In this sealing ring the entire structure is retained in the grooves and performs its multiple contact sealing function wholly therein.

Still another feature of this invention is the provision of an annular sealing member having a bifurcated outer peripheral surface and a bifurcated inner annular surface. The bifurcations extend between and lie within the annular grooves in the respective race rings, and are compressed thereby to form a running contact seal with the walls of the grooves.

A further feature of this invention includes having the annular radially extending groove in only the outer member, and a sealing ring having an annular body portion with an outer sealing portion extending radially outwardly therefrom toward the outer member. The sealing portion comprises a pair of extensions each of which are positioned in the groove of the outer member in running engagement with a respective wall. At least one of the extensions of the pair applies pressure on its respective wall and on the other extension of the pair in its running engagement with the other wall of the groove.

In accordance with one embodiment of this invention, the anti-friction ball bearing assembly includes an inner race ring and an outer race ring forming a raceway for receiving a series of rolling elements. An annular sealing member of a rigid but slightly resilient synthetic material includes a body portion having a sealing portion extending radially outwardly therefrom and a sealing portion extending radially inwardly therefrom. Each of the radially extending sealing portions includes a pair of extensions which are separated axially from one another at their outer radial ends and join one another at their inner radial ends. At least one extension of each pair is fitted and maintained in corresponding grooves in the inner and outer race rings. The other extension in the pair applies pressure on its corresponding race ring and on the extension received in the groove to maintain a running contact seal with the wall thereof.

The annular sealing member could take the form of a sealing ring which constitutes the body of the seal and whose outer peripheral edge and inner annular edge each forms one of the extensions of the outwardly and inwardly radially extending sealing portions. One of a pair of radial extensions integral with the face of the sealing ring extends generally radially outwardly to the outer peripheral edge of the ring and the other radially inwardly toward the inner annular edge of the ring. These extensions are separated at their radial ends from the peripheral and annular edges of the sealing ring and cooperate therewith to form the inwardly and outwardly radially extending sealing portions. The annular sealing member could take still another form with the outwardly and inwardly radially extending sealing portions formed by a sealing ring that has a bifurcated outer peripheral edge and a bifurcated inner annular edge. The bifurcations or extensions are separated at their radial ends from each other to form the pairs of extensions of the sealing portions.

In a further modification of the invention, only the outer race ring has a groove therein. The sealing ring comprises an annular body portion with an outer sealing portion extending radially outwardly therefrom toward the outer member. The sealing portion comprises a pair of extensions each extension positioned in the groove of the outer member in running engagement with a respective wall thereof. At least one of the extensions of the pair applies pressure on its respective wall and on the other extension of the pair in its running engagement with the wall of the groove. The bore of the seal defined by the inner annular edge rides in a close fit about the inner race ring. This embodiment of the seal provides an excellent seal against the escape of lubricant from the lubricant holding space between the two race rings. In operation, as the outer race ring rotates about the inner race ring centrifugal force keeps the lubricant against the outer race ring and the seal confined in the groove of the outer race ring prevents the lubricant from being thrown out of the lubricant holding space causing bearing failure.

Description of the drawing

FIG. 1 is a perspective view, partly in section, of a bearing assembly and seal structure in accordance with this invention (the bearing is a ball bearing for illustrative purposes, but could be any other anti-friction bearing with two race rings);

FIG. 2 is a fragmentary cross-sectional view of the bearing assembly of FIG. 1;

FIG. 3 is an expanded cross-sectional view of the seal structure in fragmentary portions of the two race rings;

FIG. 4 is a front view of the seal structure of FIG. 1;

FIG. 7 is an expanded cross-sectional view of a further embodiment of the seal structure in accordance with this invention; and FIG. 8 is an expanded cross-sectional view of a modification of the embodiment of the seal structure shown in FIG. 7.

Detailed description

Figure 5:
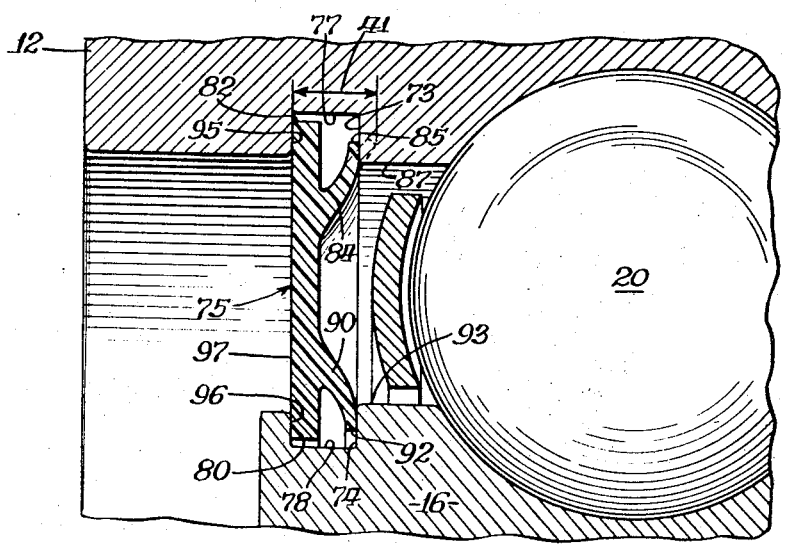
FIG. 5 is an expanded cross-sectional view of a second embodiment of the seal structure.

The bearing assembly 10 includes an outer race ring 12 which has a ball track 14, and an inner race ring 16 which has a ball track 18. The race rings 12 and 16 have a common axis and form a raceway in the bearing tracks 14 and 18 between the respective outer and inner faces thereof. A series of rolling elements 20 are positioned in the raceway by separator 24. An inner lands portion 30 on the inner race ring 16 and a corresponding outer lands portion 32 on the outer race ring 12 restrict the axial movement of the rolling elements 20. The inner diameter of the outer race ring is mated to the outer diameter of the inner race ring. A pair of grooves 40 extend radially into the inner surface of the outer race ring 12 while an oppositely disposed pair of grooves 42 extend radially into the outer peripheral surface of the inner race ring 16. The grooves 40 and 42 are located substantially near the outboard axial ends of the respective race rings. The space between the inner and outer race rings at their axial ends thereof is provided with a sealing structure in the manner hereinafter described. Although the seal will be described for only one outboard axial end of the bearing 10, it should be clear that the description pertains equally to the seal at the opposite axial end, or in those bearings where only one axial end of the structure is sealed.

In accordance with this invention, an annular sealing ring 50 shown in FIGS. 1-4 made from rigid but slightly resilient material, preferably molded from a plastic or synthetic material such as nylon, forms a flexible sealing structure. When the preferred nylon and plastic materials are used, it is known that they tend to cold flow after substantial continued use and conform themselves to the available confining space. In addition, many plastic materials, and particularly nylon, are known to have self-lubricating properties so that close tolerances between the mating surfaces of the race rings are not needed.

The sealing ring 50 has an outer peripheral edge 54 and an inner annular edge 56 that defines the radial face 58 of the ring. Molded integral with the radial face 58, and extending outwardly therefrom are two resilient sealing extensions or lip portions 60 and 62 respectively. The outer extension 60 extends radially outwardly in a direction generally divergent to the sealing ring 50 such as to form an acute angle 65 between the extension 60 and the outboard radial face of the sealing ring 50. The inner extension 62 extends radially inwardly in a direction generally divergent to the sealing ring 50 such as to form an acute angle 67 between the extension 62 and the outboard radial face 58 of the sealing ring 50.

In operation, the ring 50 is positioned within the grooves 40 and 42 with the inner annular edge 56 inserted with a close running fit into the groove 42 in the inner race ring 16 to maintain the ring 54 in position and to resist the axial displacement of ring 50 by foreign material. The outer peripheral edge 54 is received in a close running fit within the groove 40. The diameter of the outer extension 60 at the outer radial end 61 thereof is greater than the diameter of the bore of the outer race 12 at 69. Therefore, when the ring 50 is positioned within the grooves, the extension 60 is resiliently compressed by the outer race 12. Similarly, the diameter of the inner extension 62 at the outer radial end 63 thereof is less than the diameter of the peripheral surface of the inner race 16 at 71 so that the extension 62 is resiliently compressed thereby. This results in the extensions 60 and 62 forming an interference fit with the inner surface of the outer race and the peripheral surface of the inner race respectfully. The lip extensions when compressed by the race rings react to resiliently press the ring 50 against the walls 51 and 53 of the grooves 40 and 42 to form a running contact seal therewith.

The sealing action of this invention is provided by the interference fit of the extensions with the races and the running contact seal between the ring 50 and the walls of the grooves. Therefore, any foreign material that could conceivably pass between the extensions and the race units would be blocked from the raceway by the running contact seal between the ring 50 and the walls of the grooves.

Because synthetic materials such as nylon are pressure sensitive, they will cold flow away from the surface with which they have contact. In addition, they exhibit a tendency to pick up moisture resulting in expansion of the material or, if in a warm atmosphere, to lose moisture resulting in contraction of the material. The seal ring 50 of this invention, however, is confined radially in both directions by the grooves 40 and 42. Therefore, if the seal ring 50 expands or contracts it will only enhance the close running fit of the peripheral edge 54 and annular edge 56 of the seal ring with the grooves 40 and 42. Because the effectiveness of the seal ring 50 does not depend on an interference or labyrinth fit between the seal edges and the bottoms of the grooves, but rather on the running contact fit between the seal and the walls 51 and 53 of the respective races, the pressure sensitivity of the nylon does not create any particular problems. The reduced cross-sections of the extensions compared to the ring 50 makes the same thin enough and resilient enough to permit a relatively heavy interference with the inner 16 and outer 12 race rings so that the pressure sensitivity of the nylon can be disregarded and contact will remain between the lip portions and the race rings for the life of the bearing.

FIG. 5 shows a second embodiment of the sealing arrangement. The ring 75 is positioned within the grooves 77 and 78 with the inner annular edge 80 and the outer peripheral edge 82 in a close running fit therewith. The diameter of the outer extension 84 at the outer radial end 85 thereof is greater than the diameter of the bore of the outer race 12 at 87. Likewise, the diameter of the inner extension 90 at the outer radial end 92 thereof is less than the diameter of the peripheral surface of the inner race 16 at 93. Furthermore, the axial dimension or width of the grooves 77 and 78 is less than the axial dimension 41 between the sealing ring 75 and the extensions 84 and 90. For purposes of illustrating the dimension 41, the extension 84 is shown dotted in the position it would occupy if not confined in the groove 77. In this embodiment, instead of the extensions 84 and 90 making an interference fit with the outer peripheral surfaces of the inner race ring and the bore of the outer race ring, they are confined within the grooves 77 and 78 respectively and resiliently compressed by the walls 73 and 74 into a running contact seal therewith. The resiliently compressed lips then react to bias or pressure the annular sealing ring 75 into a running contact seal with the walls 95 and 96.

The sealing action of this embodiment is very efficient, for instance, if foreign particles could possibly work their way between the walls 95 and 96 and the sealing ring 75 into the grooves 40 and 42, any further movement of the particle in an axial direction would only serve to press the extensions 84 and 90 more firmly against the walls 73 and 74. Furthermore, in the bearing using this seal was to be re-lubricated while in operation, the seal would lend itself to venting off the internal re-lubrication pressures built up in the bearing raceway. As the pressure increased, the extensions 84 and 90 would move away from the walls 73 and 74 thereby permitting the lubricant to pass into the grooves 77 and 78. If passages existed between the seal ring 75 and the walls 95 and 96 formed, for instance, by indentations in the radial face 97 of the sealing ring 75, the lubricant could be bled from the raceway, around the outer radial ends 85 and 92 of the ring 75, and to the atmosphere through these passages thereby relieving the internal re-lubricating pressures.

Figure 6:
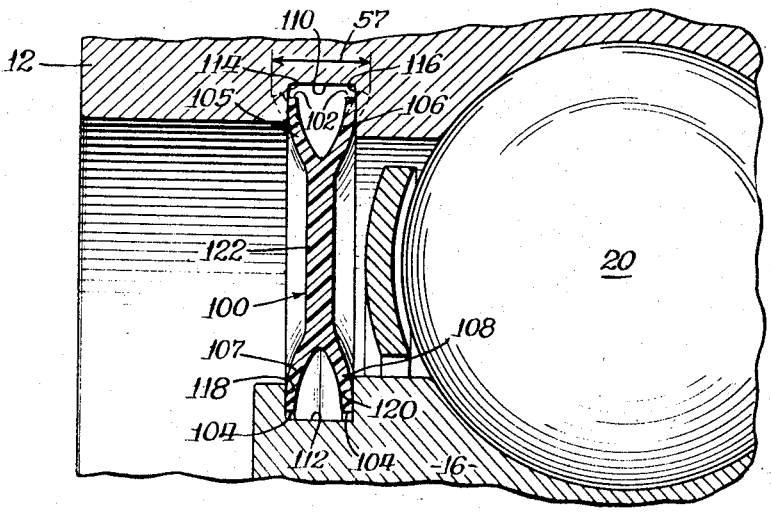
FIG. 6 is an expanded cross-sectional view of a third embodiment of the seal structure.

FIG. 6 illustrates a third embodiment of the invention. In this embodiment the sealing ring 100 has a bifurcated outer periphery 102 and a bifurcated inner annular edge 104. The axial dimension 57 between the bifurcations or extensions 105, 106 and 107, 108 is greater than the width or axial dimension of the grooves 110 and 112. For purposes of illustrating the dimension 57, the bifurcations 105 and 106 are shown dotted in the position they would have occupied if not confined in the groove 110.

The sealing ring 100 is inserted between the race rings 12 and 16 by resiliently compressing the bifurcations 105, 106 and 107, 108 between the walls 114, 116 and 118, 120 respectively of the grooves 110 and 112. The reduced cross-section of the bifurcations as compared to the body 122 of the seal make the same thin enough and resilient enough to permit a relatively heavy running contact seal between the bifurcations and the walls of the grooves.

In many applications, bearings operate in a relatively clean environment where there is little danger of contamination of the lubricant from outside sources. In these bearings, failure sometimes occurs because of lubricant being thrown out of the lubricant holding space between the bearing race rings, resulting in bearing failure. The unique concept of the seal of this invention may be readily adapted to provide means for retaining the lubricant within this space and extending the life of the bearing.

Referring to FIG. 7, the bearing 130 comprises an outer race ring or member 132 which is rotatable with respect to the inner race ring or member 134. Therefore, as the outer race ring 132 rotates about the inner race ring 134, lubricant in the lubricant holding space 136 is thrown by centrifugal force against the inner diameter of the outer race ring 132. Anti-friction elements, in this case in the form of balls 138, are positioned in the raceway formed by the two race rings by separator 140.

The seal 142 is mounted in outer race ring 132 in a manner to be described subsequently. Although the seal 142 will be described in only one outboard axial end of the bearing 130, it should be clear that the description pertains equally to the seal at the opposite axial end, or in those bearings where only one axial end of the structure is sealed.

The seal 142 includes an annular body portion 143, is ring-like in configuration and has an annular face 144 formed by an outer peripheral edge 146 and inner annular edge 148, which also defines the bore of the seal. An extension 150 integral with the sealing ring extends radially outwardly towards the outer race ring 132.

The sealing ring 142 is mounted in the outer race ring 132 by inserting the outer peripheral edge 146 and the extension 150 into a radial groove 152 in the outboard axial end of the bearing 130. The extension 150 is compressed by wall 153 of the groove 152 and rides in a running engagement therewith. The extension 150 which is of reduced cross-section compared to the outer peripheral edge 146 applies pressure on that portion of the sealing ring and biases the seal face 144 into running engagement with the wall 154 of the groove 152. The seal face 144 and extension 150 provide the outer sealing portion of the seal. The bore of the sealing ring 142, which is defined by the inner annular edge 148, is fitted in a close running fit about the inner race 134 of the bearing 130.

In operation as the outer race ring 132 turns about the inner race 134, lubricant in the lubricant holding space 136 is thrown by centrifugal force against the inner diameter of the outer race ring 132. The force of the lubricant moves the sealing ring 142 outward; however, this results in the face 144 of the sealing ring being pressed more tightly against the wall 154 such that the lubricant cannot escape past the seal. Due to the centrifugal force keeping the lubricant against the inner diameter of the outer race ring, there is little tendency for the lubricant to escape from the small clearance between the inner annular edge 148 and the inner race 134 of the bearing. As a result, the seal 142 retains the lubricant in the lubricant holding space 136 during operation of the bearing thereby greatly extending bearing life and reducing maintenance.

Another embodiment of the seal shown in FIG. 7 is illustrated in FIG. 8. Parts in FIG. 8 similar to those in FIG. 7 are given like numbers. In this embodiment, the sealing ring 160 has an inner annular edge 162 that defines the bore of the seal. The ring 160 has a bifurcated outer peripheral edge comprising first and second extensions 164 and 165 that extend radially, outwardly towards the outer race ring 132. The extensions are of a reduced cross-section as compared to the annular body portion 167 of the seal. The seal 160 is mounted to the axial end of the bearing 130 by inserting the bifurcated portions 164 and 165 into the groove 152. The bifurcated portions are compressed by the walls 154 and 153 of the groove 152 and ride in running contact fit therewith.

As in the embodiment described in conjunction with FIG. 7, any pressure exerted on the seal 160 by the force of the lubricant being thrown outwardly by centrifugal force acting on the lubricant tends only to move the portion 164 of the seal into closer contact with the wall 154 of the groove 152 thereby preventing escape of the lubricant.

What has been described, therefore, is a relatively simple and inexpensive multiple contact seal that extends bearing life both by restricting contamination from entering the lubricant holding space and by preventing lubricant from escaping from the space past the seal.

I claim:

1. In a bearing assembly having an inner race ring fixed against rotation and an outer race ring rotatable about said inner race ring, the rings being spaced apart for receiving anti-friction elements and lubricant therebetween, means for sealing such space to prevent the loss of lubricant therefrom only during rotation of the outer race ring, including in combination, two radial walls defining an annular radially extending groove in the rotatable outer member, sealing ring means comprising an annular body portion and an outer sealing portion, said outer sealing portion comprising a pair of extensions, each said extension positioned in said groove of the outer member in contact with a respective wall thereof, and at least one of said extensions of said pair applying pressure on its respective wall and on the other extension of said pair thereby retaining said sealing means in the outer race ring with the same rotating therewith, the annular body portion of said sealing ring means includes an inner annular edge defining a bore, said bore being fitted in a radially spaced relation about the inner race ring and in a close running fit therewith.

2. The bearing assembly of claim 1 wherein said sealing ring means includes an annular sealing ring having an annular face forming said body portion, said ring having an outer peripheral edge and an outer extension integral therewith, said outer peripheral edge and said outer extension forming said outer sealing portion and both said outer peripheral edge and said outer extension being confined within said groove, said outer extension being resiliently compressed by one wall of said groove and applying pressure to said sealing ring to maintain the same against the wall opposite said one wall of said groove, thereby retaining said sealing ring means in the outer race ring.

3. The bearing assembly of claim 1 wherein said outer sealing portion includes a bifurcated outer peripheral edge of said body portion having first and second extensions extending radially outwardly toward the outer race ring, said outer extensions extending into and being resiliently compressed by said walls of said groove to retain said sealing ring means in the outer race ring.

References Cited

UNITED STATES PATENTS

| 2,173,247 | 9/1939 | Bott | 308—187.2 |
| 2,547,185 | 4/1951 | Von Bolhar | 277—206 X |
| 2,688,506 | 9/1954 | Bakker | 277—206 |
| 3,007,723 | 11/1961 | Clarke | 277—206.1 |
| 3,195,902 | 7/1965 | Tisch | 277—207 |
| 3,366,428 | 1/1968 | Smith | 308—187.2 |

MARTIN P. SCHWADRON, *Primary Examiner.*

L. L. JOHNSON, *Assistant Examiner.*